(12) United States Patent
Hart et al.

(10) Patent No.: US 11,407,045 B2
(45) Date of Patent: Aug. 9, 2022

(54) TILE SAW

(71) Applicant: TTI (MACAO COMMERCIAL OFFSHORE) LIMITED, Macau (MO)

(72) Inventors: Michael R. Hart, Anderson, SC (US); Sumithra Janardhanan, Saratoga, CA (US)

(73) Assignee: Techtronic Power Tools Technology Limited

( * ) Notice: Subject to any disclaimer, the term of this patent is extended or adjusted under 35 U.S.C. 154(b) by 944 days.

(21) Appl. No.: 16/114,344

(22) Filed: Aug. 28, 2018

(65) Prior Publication Data

US 2020/0070264 A1   Mar. 5, 2020

(51) Int. Cl.
| | |
|---|---|
| *B23D 47/02* | (2006.01) |
| *B28D 1/04* | (2006.01) |
| *B28D 7/04* | (2006.01) |

(52) U.S. Cl.
CPC ........... *B23D 47/025* (2013.01); *B28D 1/047* (2013.01); *B28D 7/04* (2013.01); *Y10T 83/647* (2015.04)

(58) Field of Classification Search
CPC .......... B28D 1/047; B28D 7/02; B28D 1/042; B28D 7/04; B28D 5/024; B23D 45/02; B23D 47/025; Y10T 83/6608; Y10T 83/293; Y10T 83/242; Y10T 83/647; Y10T 83/2066; Y10T 83/263; Y10T 83/283; F16C 29/04; F16C 29/045; F16C 29/005; F16C 29/12; F16C 29/123
USPC .............. 125/13.01, 13.03, 35; 29/DIG. 101; 451/213; 104/135, 243; 384/53, 54, 55, 384/57, 58
See application file for complete search history.

(56) References Cited

U.S. PATENT DOCUMENTS

| | | | | |
|---|---|---|---|---|
| 1,923,853 A | * | 8/1933 | Adrianusvan | B26D 7/00 384/49 |
| 1,926,828 A | * | 9/1933 | Van Berkel | B23Q 1/40 83/713 |
| 2,526,518 A | * | 10/1950 | Turrettini | F16C 29/045 384/51 |
| 2,598,251 A | * | 5/1952 | Gesner | B27B 5/201 384/58 |

(Continued)

FOREIGN PATENT DOCUMENTS

| | | |
|---|---|---|
| CA | 2551848 A1 | 1/2007 |
| CN | 1240161 | 1/2000 |

(Continued)

OTHER PUBLICATIONS

European Patent Office Extended Search Report for Application No. 19194165.7 dated Jan. 13, 2020 (9 pages).

*Primary Examiner* — Laura M Lee
(74) *Attorney, Agent, or Firm* — Michael Best & Friedrich LLP

(57) ABSTRACT

A tile saw includes a table configured to support a workpiece, a guide rail upon which the table is supported and movable along a longitudinal axis, a saw unit for cutting the workpiece as the table moves along the longitudinal axis, and a roller assembly for coupling the table to the guide rail. The roller assembly includes an upper roller engaged with an upper portion of the guide rail, a lower roller engaged with a lower portion of the guide rail, and a resilient member biasing at least one of the upper roller or the lower roller against the guide rail.

13 Claims, 4 Drawing Sheets

(56) References Cited

U.S. PATENT DOCUMENTS

| | | | |
|---|---|---|---|
| 2,819,709 A * | 1/1958 | MacGregor | B28D 1/042 125/13.03 |
| 2,918,333 A * | 12/1959 | Friedman | B21J 13/04 384/53 |
| 3,970,127 A * | 7/1976 | Thiele | B23Q 1/03 144/242.1 |
| 4,564,000 A | 1/1986 | Stern et al. | |
| 4,619,078 A | 10/1986 | Uhlig | |
| 4,896,647 A | 1/1990 | Valva et al. | |
| 5,437,125 A | 8/1995 | Barton, II | |
| 5,642,941 A * | 7/1997 | Mouezy | B23Q 1/40 384/13 |
| 5,676,124 A | 10/1997 | Lee | |
| 5,743,193 A | 5/1998 | Swan | |
| 5,820,269 A * | 10/1998 | Ariga | A47B 88/40 384/53 |
| 5,947,103 A | 9/1999 | Saccon | |
| 6,000,387 A | 12/1999 | Lee | |
| 6,080,041 A | 6/2000 | Greenland | |
| 6,119,676 A | 9/2000 | Greenland | |
| 6,149,308 A * | 11/2000 | Schroeder | F16C 29/005 384/50 |
| 6,152,127 A | 11/2000 | Fuhrman et al. | |
| 6,253,757 B1 | 7/2001 | Benson | |
| 6,263,866 B1 | 7/2001 | Tsao | |
| 6,272,961 B1 | 8/2001 | Lee | |
| 6,273,081 B1 | 8/2001 | Gorgol et al. | |
| 6,283,110 B1 | 9/2001 | Lee | |
| 6,347,624 B1 | 2/2002 | Smith et al. | |
| 6,390,086 B1 | 5/2002 | Collins et al. | |
| 6,427,677 B1 | 8/2002 | O'Banion et al. | |
| 6,435,218 B2 | 8/2002 | Hulett | |
| 6,439,218 B2 | 8/2002 | Hulett | |
| 6,508,281 B1 | 1/2003 | Wang | |
| 6,637,424 B1 | 10/2003 | Fuhrman et al. | |
| 7,406,942 B2 | 8/2008 | Chen | |
| 7,497,239 B2 | 3/2009 | Smith | |
| 7,552,725 B2 | 6/2009 | Chen et al. | |
| 7,926,477 B2 | 4/2011 | Li | |
| 8,656,902 B2 | 2/2014 | Wei et al. | |
| 9,616,593 B2 | 4/2017 | Elemstrand et al. | |
| 2004/0099111 A1 | 5/2004 | Adkins | |
| 2005/0047688 A1 * | 3/2005 | Hama | F16C 29/048 384/57 |
| 2006/0219074 A1 | 10/2006 | Zhang | |
| 2007/0144509 A1 | 6/2007 | Li | |
| 2008/0087153 A1 | 4/2008 | Lee | |
| 2009/0060402 A1 * | 3/2009 | Hama | F16C 29/12 384/40 |
| 2009/0277315 A1 * | 11/2009 | Ipatenco | F16C 29/02 83/171 |
| 2012/0118278 A1 | 5/2012 | La Banco et al. | |
| 2014/0173824 A1 | 6/2014 | Lorenz et al. | |
| 2014/0261367 A1 | 9/2014 | Ipatenco et al. | |
| 2014/0352680 A1 | 12/2014 | Chen | |
| 2017/0120477 A1 | 5/2017 | Chang | |
| 2017/0157797 A1 | 6/2017 | Wung | |
| 2017/0173823 A1 | 6/2017 | Elemstrand et al. | |
| 2017/0173824 A1 | 6/2017 | Sergyeyenko et al. | |

FOREIGN PATENT DOCUMENTS

| | | | |
|---|---|---|---|
| DE | 1900951 | 9/1964 | |
| DE | 78841 A1 | 1/1979 | |
| DE | 3013988 A1 | 10/1981 | |
| DE | 3543274 | 6/1987 | |
| DE | 3834900 A * | 4/1990 | F16C 29/04 |
| DE | 3834900 A1 | 4/1990 | |
| EP | 0494039 | 7/1992 | |
| EP | 0506533 | 9/1992 | |
| EP | 0895842 | 2/1999 | |
| EP | 1129814 A2 * | 9/2001 | B27B 5/222 |
| EP | 1256733 | 11/2002 | |
| EP | 2584209 A1 * | 4/2013 | F16C 29/045 |
| FR | 1346324 | 12/1963 | |
| FR | 1361904 | 5/1964 | |
| FR | 2560109 | 8/1985 | |
| WO | 200134359 | 5/2001 | |
| WO | 2010107425 | 9/2010 | |
| WO | 2010107937 | 9/2010 | |
| WO | 2013072761 | 5/2013 | |

* cited by examiner

TILE SAW

FIELD OF THE INVENTION

The present invention relates to power tools. Specifically, the present invention relates to tile saws.

BACKGROUND OF THE INVENTION

Conventionally, power tile saws include a base that supports a table upon which a workpiece is supported. A blade assembly is coupled to the base for scoring or cutting the workpiece, such as tile or masonry stone. When in operation, the table is movable relative to the blade assembly such that a straight cut can be performed.

SUMMARY OF THE INVENTION

In one aspect, the invention provides a tile saw including a table configured to support a workpiece, a guide rail upon which the table is supported and movable along a longitudinal axis, a saw unit for cutting the workpiece as the table moves along the longitudinal axis, and a roller assembly for coupling the table to the guide rail. The roller assembly includes an upper roller engaged with an upper portion of the guide rail, a lower roller engaged with a lower portion of the guide rail, and a resilient member biasing at least one of the upper roller or the lower roller against the guide rail.

In another aspect, the invention provides a method for assembling a tile saw including a base upon which a guide rail is coupled, a table movably coupled to the guide rail along a longitudinal axis, and a roller assembly to support the table on the guide rail. The method comprises the steps of aligning and engaging the roller assembly with the guide rail of the base, biasing a lower roller of the roller assembly into contact with a portion of the guide rail, and locking the lower roller into a fixed position relative to the portion of the guide rail, such that contact is maintained between the lower roller and the portion of the guide rail.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mounting, connections, supports, and couplings.

Figure 1:
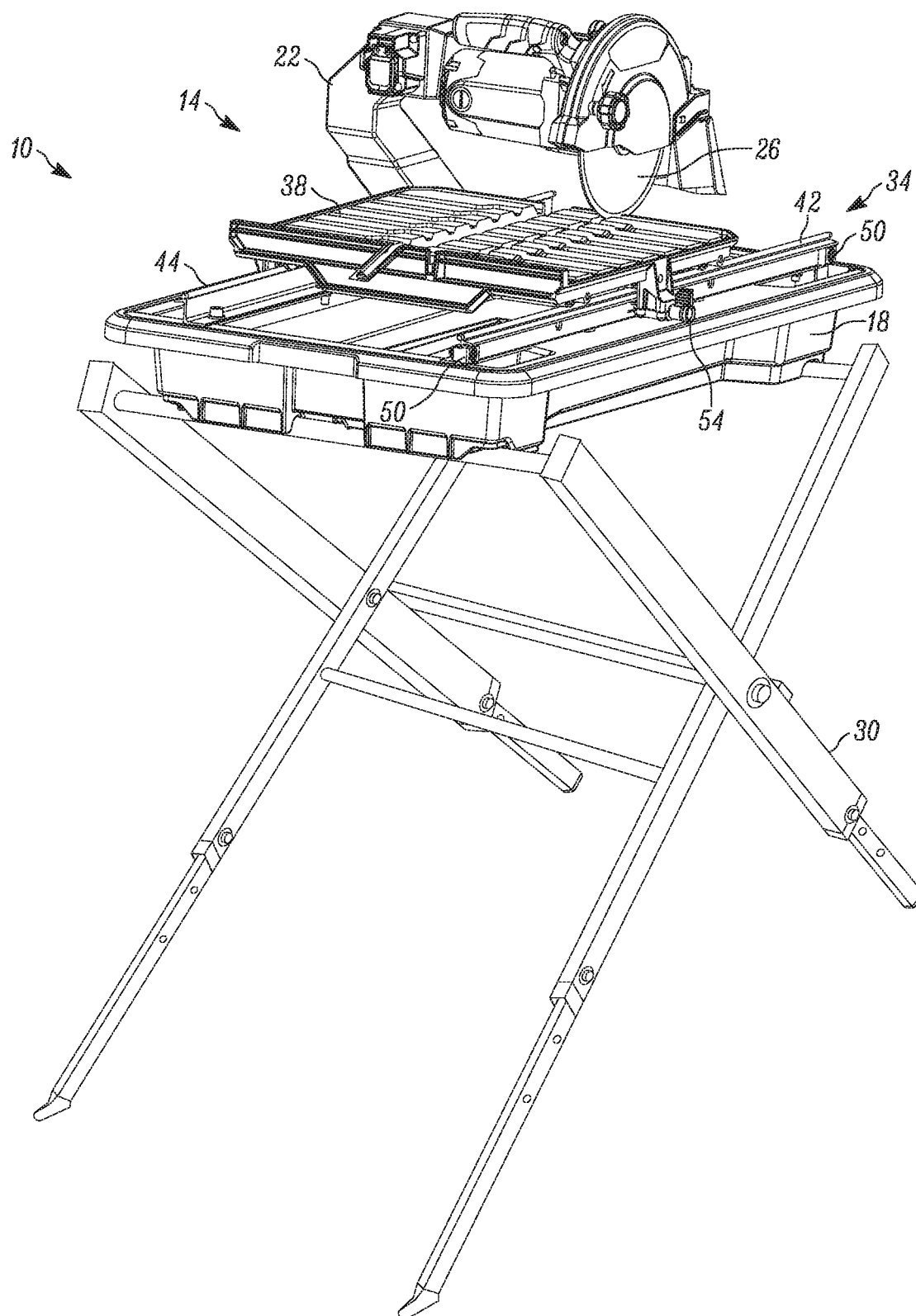
FIG. 1 is a perspective view of a tile saw in accordance with an embodiment of the invention.

FIG. 1 illustrates a tile saw 10 that can be used to accurately and quickly cut workpieces or construction materials such as ceramic, marble, or granite tiles and the like. As illustrated in FIG. 1, the file saw 10 includes a saw unit 14, a base 18, and a saw arm 22 that supports the saw unit 14 relative to the base 18. The saw unit 14 includes a cutting blade 26 driven by an electric motor (not shown) for cutting the workpiece. The electric motor may receive electrical power from a remote power source (e.g., an AC outlet via a power cord) or an onboard power source a DC battery pack). The base 18 includes a basin that contains a liquid, such as water, that cools the cutting blade 26 and carries away debris removed during the cutting process.

Figure 2:
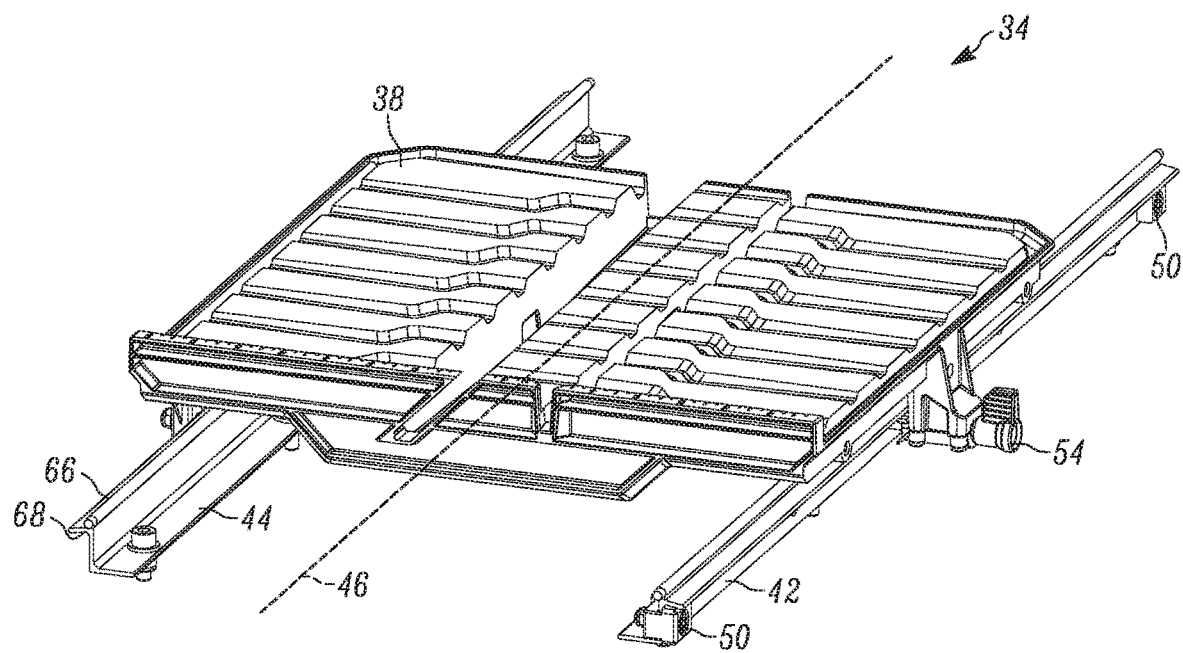
FIG. 2 is a top perspective view of a table and guide rails of the tile saw of FIG. 1.

The base 18 is a structural component and is typically supported by a frame or a stand 30 at a suitable working height. The base 18, in turn, supports a table assembly 34. The table assembly 34 includes a table 38 that is operable to support the workpiece. The table assembly 34 also includes a pair of guide rails 42, 44 upon which the table 38 is supported for movement. Specifically, the table 38 is movable relative to the guide rails 42, 44 in a direction along a longitudinal axis 46 (FIG. 2). The guide rails 42, 44, in turn, are fixed to the base 18 (e.g., with fasteners).

Figure 3:
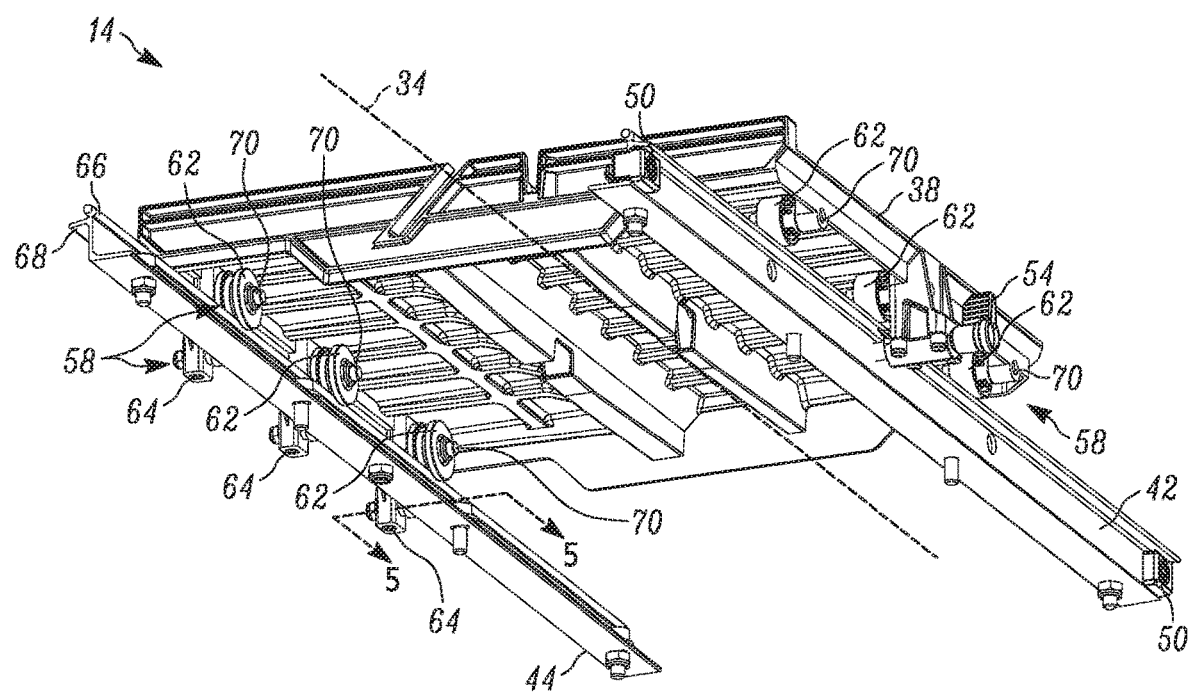
FIG. 3 is a bottom perspective view of the table and guide rails of FIG. 2, illustrating roller assemblies of the table engaged with the guide rails.

With reference to FIGS. 1-3, the tile saw 10 further includes a pair of stopper elements 50, one disposed at each distal end of the guide rail 42, for inhibiting inadvertent removal of the table 38 from the guide rails 42, 44. However, the table 38 includes a lock assembly 54 that is adjustable from a locked position to an unlocked position to enable selective removal of the table 38 from the guide rails 42, 44. In the locked position, at least a portion of the lock assembly 54 is extended toward the guide rail 42 to mechanically interfere with both stopper elements 50, thereby inhibiting the lock assembly 54 (and therefore the table 38) from moving beyond the stopper elements 50 in a direction parallel to the longitudinal axis 46. In the unlocked position, at least a portion of the lock assembly 54 is retracted and spaced away from the guide rail 42, thereby allowing the lock assembly 54 (and therefore the table 38) to pass over and move beyond the stopper element 50 in a direction parallel to the longitudinal axis 46. As a result, the table 38 is removable from the guide rails 42, 44, but only when the lock assembly 54 is adjusted from the locked position to the locked position. It may be desirable to remove the table 38 away from the base 18 to clean, transport, or perform maintenance to the tile saw 10.

Figure 4:
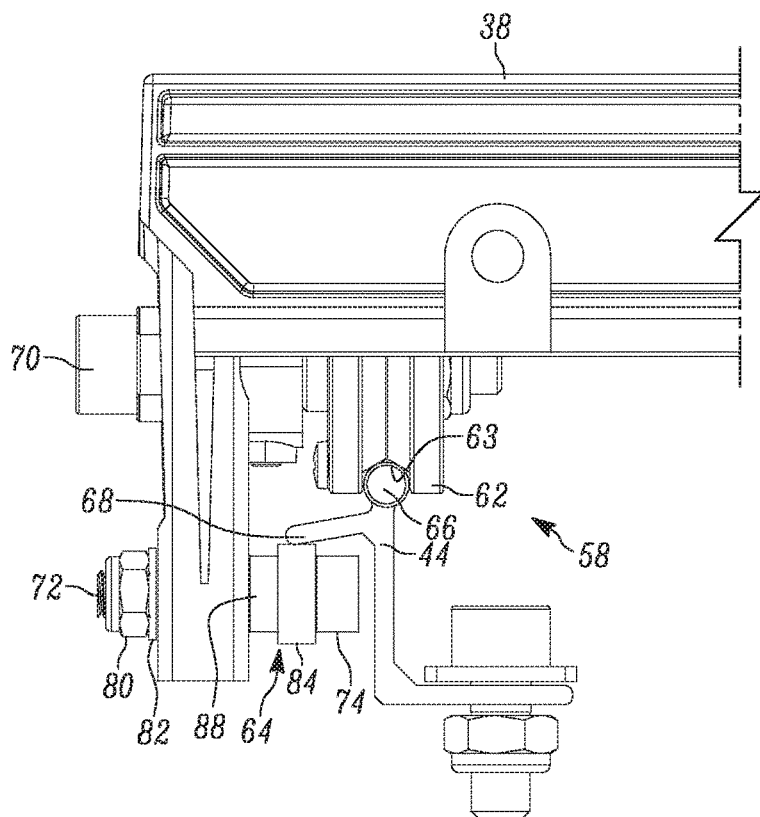
FIG. 4 is an enlarged, front plan view of the table and one of the guide rails of FIG. 2, illustrating the roller assembly engaged with the guide rail.

With reference to FIGS. 3 and 4, the table assembly 34 includes multiple roller assemblies 58 between the table 38 and the guide rails 42, 44 to facilitate movement of the table 38 relative to the guide rails 42, 44. Each of the roller assemblies 58 includes an upper roller 62 that engages an upper portion 66 of the guide rail 42, 44 and a lower roller 64 that engages a lower portion 68 of the guide rail 44. In the illustrated embodiment, lower rollers 64 are omitted from the side of the table assembly 34 engaged with the guide rail 42 to avoid mechanical interference with the stopper elements 50. The lock assembly 54 and the lower rollers 64 inhibit inadvertent vertical (e.g., upward) movement of the table 38 relative to the guide rails 42, 44.

With continued reference to FIGS. 3 and 4, each of the roller assemblies 58 also includes a shaft 70 (e.g., a bolt) that rotatably supports an upper roller 62 upon the table 38. In the illustrated embodiment, the upper portion 66 of each guide rail 42, 44 is cylindrical-shaped, and the upper rollers 62 engaged with the guide rail 44 have a circumferential groove 63 (FIG. 4) in which the cylindrical-shaped upper portion 66 of the guide rail 44 is received. This arrangement facilitates engagement between the upper rollers 62 and the guide rail 44 while also inhibiting inadvertent lateral movement of the table 38 relative to the longitudinal axis 46.

Figure 5:
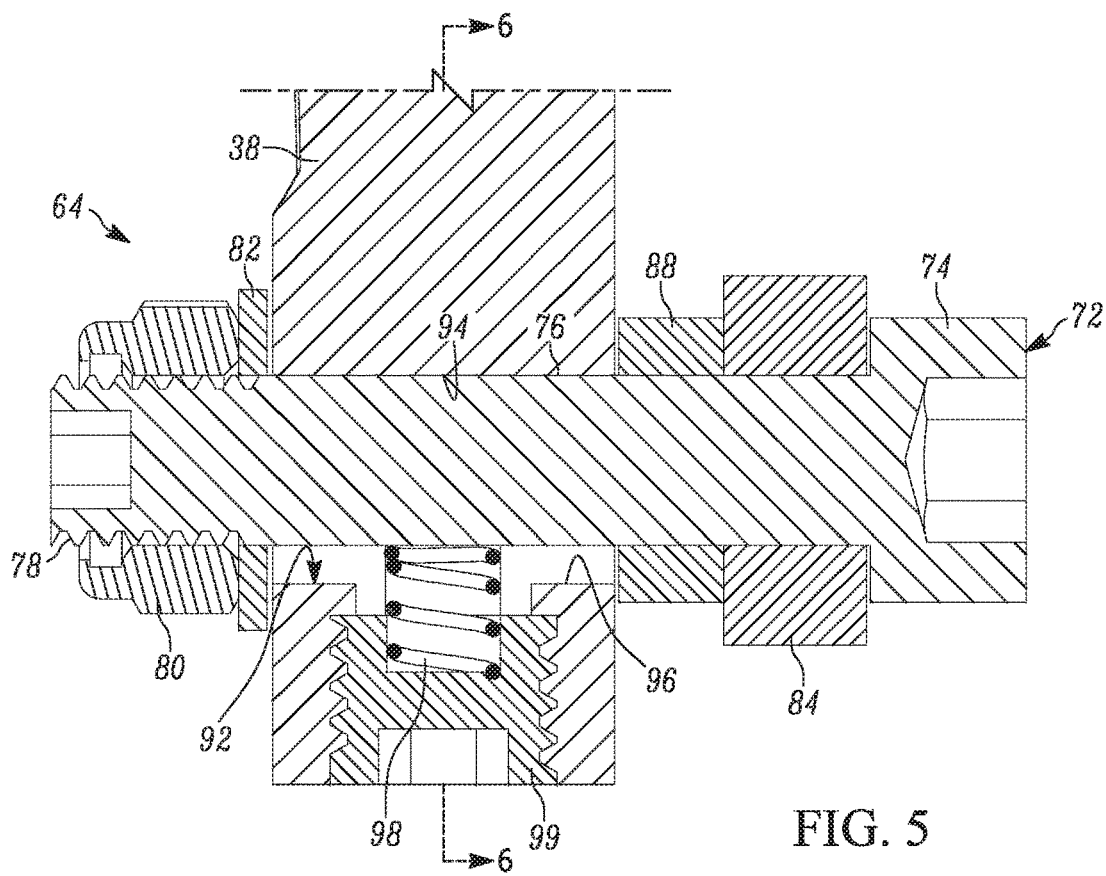
FIG. 5 is a cross-sectional view of one of the roller assemblies taken along line 5-5 of FIG. 3.

With reference to FIGS. 4 and 5, each of the roller assemblies 58 also includes a shaft 72 that rotatably supports the lower roller 64 upon the table 38. In the illustrated embodiment, the shaft 72 is a conventional socket-head bolt including a socket head 74 operable to receive a standard hex key wrench, an unthreaded region 76, and a threaded region 78 operable to receive a corresponding nut 80. When the nut 80 is tightened, a washer 82 bears against a lateral side of the table 38. Each roller 64 further includes a bearing 84 that contacts and engages the lower portion 68 of the guide rail 44 and a spacer 88 that spaces the bearing 84 away from the table 38 to permit free, unrestricted rotation of the bearing 84. In the illustrated embodiment, the bearing 84 is a conventional ball bearing that rotates relative to the shaft 72. Although not shown, the bearing 84 includes an inner race supported upon the unthreaded region 76 and an outer race that rotates relative to the inner race about the unthreaded region 76. In the illustrated embodiment, the inner race of the beating 84 is a nominal slip fit upon the unthreaded region 76 of the shaft 72, permitting the bearing 84 to be installed on the shaft 72 without a press but preventing relative rotation between the inner race and the shaft 72.

Figure 6:
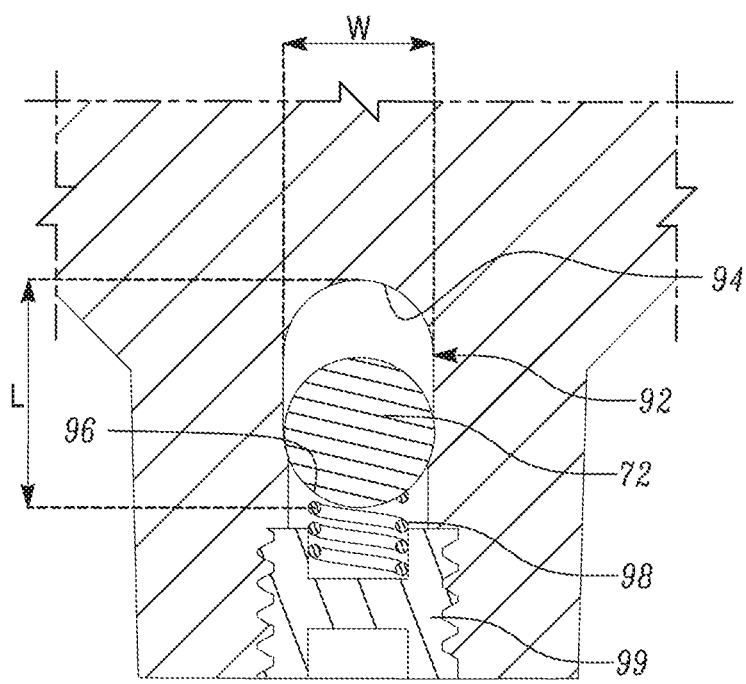
FIG. 6 is a cross-sectional view of one of the roller assemblies taken along line 6-6 of FIG. 5.

With reference to FIGS. 5 and 6, the shaft 72 of each of the roller assemblies 58 is movably coupled to the table 38 to permit the position of the lower roller 64 to be adjustable relative to the lower portion 68 of the guide rail 44. Specifically, the table 38 includes an elongated slot 92 within which the shaft 72 is received. Each elongated slot 92 defines a first end 94 and a second end 96 opposite the first end 94. The elongated slot 92 further includes a width W that is nominally greater than the diameter of the shaft 72 (FIG. 6) and a length L measured between the first end 94 and the second end 96. As illustrated, the length L of the elongated slot 92 is greater than the width W of the elongated slot 92. The shaft 72 is movable within the elongated slot 92 between a first position (FIG. 5) and a second position (FIG. 6). In the first position, the shaft 72 is adjacent the first end 94 of the elongated slot 92, and therefore, the lower roller 64 is moved toward the upper roller 62. In the second position, the shaft 72 is adjacent the second end 96 of the elongated slot 92, and therefore, the lower roller 64 is moved away from the upper roller 62. The shaft 72 is biased toward the first position by a biasing member (e.g., a compression spring 98). The roller assembly 58 further includes a plug 99 that is removably coupled to the table 38 adjacent the second end 96 of the elongated slot 92 to seat the spring 98 within the elongated slot 92. In some embodiments, the plug 99 is also movable relative to the table 38 to adjust the pre load of the spring 98. The shaft 72 is capable of moving within the elongated slot 92 when the nut 80 is loose. However, the shaft 72 is maintained in one of the first position, the second position, or any position therebetween when the nut 80 is tightened (i.e., threaded) onto the threaded region 78 until a clamping force is applied between the socket head 74 and the table 38. As a result, the shaft 72 is secured to the table 38.

To assemble the table 38 to the base 18 of the tile saw 10, the lock assembly 54 is moved to the unlocked position to allow the lock assembly 54 to pass over and move beyond the stopper element 50 of the guide rail 42. Subsequently, the upper rollers 62 are aligned with the upper portion 66 of the guide rails 42, 44, where the table 38 can be slid onto the guide rails 42, 44. Once the roller assemblies 58 of the table 38 are engaged with the guide rail 44, the lock assembly 54 is moved to the locked position to inhibit the table 38 from being removed. Because the lower roller 64 in each of the roller assemblies 58 is pre loaded by the spring 98 (via the shaft 72) in a vertical direction toward the upper roller 62, the lower rollers 64 are ensured to contact the lower portion 68 of the guide rail 44 during the initial assembly process of placing the table 38 upon the guide rails 42, 44. In other words, the vertical position of the shaft 72 is automatically positioned by the spring 98 at an appropriate height within the slot 92 in each of the roller assemblies 58, thus positioning the shaft 72 and the lower roller 64 supported thereon at an appropriate height to ensure that the lower roller 64 of each roller assembly 58 is capable of rolling contact with the guide rail 44. In this manner, manufacturing tolerances that might otherwise affect the location of the lower roller 64 relative to the upper roller 62 in each of the roller assemblies 58 are nullified. The ideal position for the shaft 72 is any position at or between the first end 94 and the second end 96 of the elongated slot 92. Once each shaft 72 is in the ideal position, each lower roller 64 is locked into this position (i.e., some position at or between the first position and the second position) via the nut 80. If it is desired to change the position of the shaft 72 relative to the elongated slot 92, the nut 80 is loosened and the biasing member 98 urges the lower roller 64 into physical contact with the lower portion 68 of the guide rail 44, where the nut 80 can be tightened once again.

Various features of the invention are set forth in the following claims.

What is claimed is:
1. A tile saw comprising:
   a table configured to support a workpiece;
   a guide rail upon which the table is supported and moveable along a longitudinal axis;
   a saw unit for cutting the workpiece as the table moves along the longitudinal axis; and
   a roller assembly for coupling the table to the guide rail, the roller assembly including
     an upper roller engaged with an upper portion of the guide rail,
     a lower roller engaged with a lower portion of the guide rail,
     a shaft that rotatably supports the lower roller,
     a slot in the table that receives the shaft and allows the shaft to move in a vertical direction within the slot toward the upper roller, and
     a resilient member biasing at least one of the upper roller or the lower roller against the guide rail.
2. The tile saw of claim 1, wherein the longitudinal axis is parallel to the guide rail.

3. The tile saw of claim 1, wherein the roller assembly is a first of a plurality of roller assemblies coupling the table to the guide rail.

4. The tile saw of claim 3, wherein the roller assemblies are equally spaced along the table relative to the direction of the longitudinal axis.

5. The tile saw of claim 1, wherein the resilient member extends into the slot to bias the shaft in the vertical direction.

6. The tile saw of claim 5, wherein the table includes an aperture having a first end in communication with the slot and an opposite, second end, wherein the resilient member is at least partly positioned in the aperture, and wherein the roller assembly further comprises a plug closing the second end of the aperture, thereby seating the resilient member between the plug and the shaft.

7. The tile saw of claim 1, wherein the shaft is movable within the slot from a first position toward a second position, in which the lower roller is moved away from the upper roller, and from the second position toward the first position, in which the lower roller is moved toward the upper roller.

8. The tile saw of claim 7, wherein the shaft includes a threaded region for threadably receiving a fastening member, and wherein the shaft is maintained in at least one of the first position or the second position when the fastening member is threaded onto the threaded region to apply a clamping force between the shaft and the table, thereby securing the shaft to the table.

9. A method of assembling a tile saw, the tile saw including a base upon which a guide rail is coupled, a table moveably coupled to the guide rail along a longitudinal axis, a saw unit for cutting a workpiece on the table, and a roller assembly to support the table on the guide rail, the method comprising the steps of:

aligning and engaging the roller assembly with the guide rail;

biasing a roller of the roller assembly into contact with a portion of the guide rail; and locking the roller into a fixed position relative to the portion of the guide rail, such that contact is maintained between the roller and the portion of the guide rail, wherein biasing the roller includes translating a shaft of the roller through a slot in the table in a vertical direction that is perpendicular to the longitudinal axis, wherein translating the shaft in the vertical direction is performed by a compression spring within the table.

10. The method of claim 9, wherein biasing the roller includes translating the shaft between a first position, in which the shaft is adjacent a first end of the slot, and a second position, in which the shaft is adjacent a second end of the slot.

11. The method of claim 9, wherein locking the roller into the fixed position includes tightening a fastening member onto the shaft of the roller.

12. The method of claim 11, wherein locking the roller into the fixed position includes applying a clamping force between the shaft and the table via the fastening member, thereby securing the shaft to the table.

13. The method of claim 9, wherein the roller is a lower roller and the tile saw further includes an upper roller, further comprising the steps of engaging the upper roller with an upper portion of the guide rail and engaging the lower roller with a lower portion of the guide rail.

\* \* \* \* \*